Patented Nov. 27, 1928.

1,693,217

UNITED STATES PATENT OFFICE.

CHARLES S. BENJAMIN, OF EAST ORANGE, NEW JERSEY, ASSIGNOR TO GENERAL CHEMICAL COMPANY, OF NEW YORK, N. Y., A CORPORATION OF NEW YORK.

METHOD OF MAKING HYDROGEN CHLORIDE AND SODIUM SULPHATE.

No Drawing. Application filed May 17, 1927. Serial No. 192,161.

This invention relates to the manufacture of hydrogen chloride and sodium sulphate (salt cake) by heating together common salt and sodium bisulphate, for example as carried out in the well known Mannheim mechanical salt cake furnace. In this process, sodium bisulphate, usually in the form of nitre cake, obtained as a byproduct in the manufacture of nitric acid from sodium nitrate and sulphuric acid, is intimately mixed with equal molecular proportions of sodium chloride (common salt) and heated to a temperature of 750-850° F. The nitre cake employed normally contains about 30% "free" sulphuric acid which, when associated with the proper proportion of sodium chloride reacts to yield hydrochloric acid and the neutral sodium sulphate. Considerable of the sodium sulphate thus produced is usually in the form of hard, dense lumps or crusts. It may be pulverized only with difficulty. Furthermore, the sulphate is impure, containing free sulphuric acid and sodium chloride. In general, the greater the excess of sulphuric acid in the mix over that theoretically required for interaction with the salt, the less will be the amount of salt and the greater will be the amount of free sulphuric acid in the sodium sulphate product.

It is the object of the present invention to provide a process for the production of hydrogen chloride and sodium sulphate from sodium bisulphate and salt wherein the resulting sodium sulphate is porous, soft, light, and when pulverized yields a free running, granular product. A further object is to provide a process wherein the amount of sodium chloride remaining in the sodium sulphate product is reduced to a minimum for a given excess of sulphuric acid in the mix.

The present improvements are based upon the discovery which I have made that when the amount of water or moisture in the mixture of sodium bisulphate and sodium chloride to be furnaced is controlled within hereinafter specified limits, very material advantages are obtained both in the improved physical state of the product and in its increased chemical purity.

In carrying out my invention, I intimately mix the sodium bisulphate, preferably in the form of nitre cake, and common salt, ground to a proper degree of fineness and regulate the proportion of each of the constituents depending upon the acidity of the bisulphate such that there will be a small excess—say 4 to 6%—of free acid in the resulting mix over that theoretically required for complete interaction. Normally, the nitre cake will contain about 30 to 35% sulphuric acid. The moisture content of the resulting mix is a widely varying characteristic, however, since both the common salt and the sodium bisulphate (nitre cake), depending upon their source and previous treatment, may contain from .2 to 8% or even more of water. I have found that by controlling the moisture content of the raw materials to give a moisture content of the mix between the limits of 2 to 3.5% by weight, that marked improvements in the physical and chemical properties of the product are obtained. According to my invention, therefore, I control the amount of moisture in the mix substantially between the limits of 2 to 3.5% by weight. When the moisture content of the mix is thus controlled, the sodium sulphate (salt cake) resulting from the application of heat to the mix at a temperature of about 800° F. until the reaction is complete, and preferably with continuous agitation, will be found to be a soft, porous mass, easily pulverized to yield a free running, granular product. Furthermore, the product will contain a minimum amount of sodium chloride for the excess of sulphuric acid employed in the original mix. If the mix contains substantially less than 2% moisture, a considerable proportion of the sodium sulphate product will be in hard, solid lumps while if there is substantially more than 3.5% moisture, the furnacing process tends to melt the sulphate and yield a product consisting of hard, dense crusts and layers. In either cast, the amount of sodium chloride remaining in the product will be greater than when the amount of moisture is controlled as specified.

As the preferred method of regulating the amount of moisture in the resulting mixture of sodium bisulphate and salt preparatory to heating, I control the amount of moisture in one or both of the constituents entering the mix, for example 100 pounds of common salt substantially dry or containing .2 to .3% moisture is intimately mixed with 250 pounds of nitre cake containing about 35% sulphric acid. The nitre cake resulting from the decomposition of sodium nitrate with sulphuric acid is normally anhydrous as the melted mass is discharged from the furnace, but frequently water is added thereto before solidification in order to lower the melting point of such nitre cake and to render it less dense. At this point, therefore, the water content of the nitre cake may easily be varied and regulated. I, therefore, control the addition of water such that there will be approximately 3 to 5% by weight of moisture in the resulting nitre cake. Under these conditions there will be a moisture content of the mix prepared as indicated above of substantially 2 to 3.5% by weight. This mix is then furnaced according to the usual method at a temperature of about 800° F. in the ordinary Mannheim furnace wherein it is subjected to continuous agitation. The resulting product is porous, soft, light, and easily pulverized to yield a free running, granular mass.

The above example is given merely by way of illustration and it is to be understood that various other ways may be employed for carrying out my invention, as by adding a regulated amount of water to the salt before mixing, or by thoroughly incorporating the desired amount of moisture in the mix just prior to furnacing.

The product is substantially anhydrous, the water content of the mix being driven off in the furnacing operation along with the hydrochloric acid gas. Hence the water content of the gases evolved from the furnace may be used as a test of whether the proper water content of the mix is being maintained, as well as by testing the water content of the mix being introduced into the furnace or the components of the mix. When using the water content of the gases as a guide, the amount of water introduced into the furnace will of course be limited so that the amount of moisture driven off any given quantity of mixture will be between 2% to 3½% by weight of said quantity of mixture.

I claim:

1. The herein described improvement in the process of manufacturing sodium sulphate and hydrochloric acid by furnacing a mixture of sodium bisulphate and salt, which consists in causing the sodium sulphate to be discharged at the end of the furnacing operation in the form of a soft, porous, and easily pulverizable material by limiting the moisture content of the material in the furnace to a restricted range intermediate between moisture conditions such as will cause the furnaced sodium sulphate to be discharged in the form of hard, compacted solid masses.

2. The herein described improvement in the process of manufacturing sodium sulphate and hydrochloric acid by furnacing a mixture of sodium bisulphate and salt which consists in regulating the moisture content of the mixture to be furnaced substantially between the limits of 2 to 3.5% by weight.

3. The herein described improvement in the process of manufacturing sodium sulphate and hydrochloric acid by furnacing a mixture of sodium bisulphate and salt, which consists in regulating the moisture content of the several constituents of the mixture to provide approximately 2 to 3.5% by weight of moisture in the mixture to be furnaced.

4. The herein described improvement in the process of manufacturing sodium sulphate and hydrochloric acid by furnacing a mixture of sodium bisulphate and salt which consists in employing substantially dry salt and regulating the moisture content of the nitre cake added thereto substantially between the limits of 3 to 5% by weight.

5. The herein described improvement in the process of manufacturing sodium sulphate and hydrochloric acid which consists in mixing sodium bisulphate and salt in approximately interacting proportions, regulating the moisture content of the mixture between the limits of 2 to 3.5% by weight, and furnacing the mixture while it is subjected to continuous agitation.

6. The herein described improvement in the process of manufacturing sodium sulphate and hydrochloric acid by furnacing a mixture of sodium bisulphate and salt, which consists in limiting the moisture content of the mixture subjected to the furnacing operation to such an extent that the amount of moisture driven off any given quantity of mixture will be between 2% to 3½% by weight of said quantity of mixture.

In testimony whereof, I affix my signature.

CHARLES S. BENJAMIN.